United States Patent
Seo et al.

(10) Patent No.: US 10,051,668 B2
(45) Date of Patent: Aug. 14, 2018

(54) METHOD AND APPARATUS FOR COMMUNICATING IN CARRIER AGGREGATION SYSTEM

(71) Applicant: LG ELECTRONICS INC., Seoul (KR)

(72) Inventors: Dongyoun Seo, Seoul (KR); Joonkui Ahn, Seoul (KR); Suckchel Yang, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 191 days.

(21) Appl. No.: 14/759,393

(22) PCT Filed: Jan. 8, 2014

(86) PCT No.: PCT/KR2014/000212
§ 371 (c)(1),
(2) Date: Jul. 6, 2015

(87) PCT Pub. No.: WO2014/109552
PCT Pub. Date: Jul. 17, 2014

(65) Prior Publication Data
US 2015/0359029 A1  Dec. 10, 2015

Related U.S. Application Data

(60) Provisional application No. 61/750,315, filed on Jan. 8, 2013, provisional application No. 61/751,921, filed on Jan. 13, 2013.

(51) Int. Cl.
*H04L 5/14* (2006.01)
*H04W 76/02* (2009.01)
(Continued)

(52) U.S. Cl.
CPC ............. *H04W 76/025* (2013.01); *H04L 1/18* (2013.01); *H04L 5/001* (2013.01); *H04L 5/0055* (2013.01);
(Continued)

(58) Field of Classification Search
CPC ..... H04L 5/0055; H04L 5/0082; H04L 5/001; H04L 1/18; H04W 16/00
See application file for complete search history.

(56) References Cited

U.S. PATENT DOCUMENTS 9,397,801 B2 * 7/2016 Kim .................. H04W 72/1263
2010/0322177 A1  12/2010 Luo et al.
(Continued)

FOREIGN PATENT DOCUMENTS

KR  10-2010-0102513  9/2010
KR  10-2012-0048707  5/2012
(Continued)

OTHER PUBLICATIONS

PCT International Application No. PCT/KR2014/000212, Written Opinion of the International Searching Authority dated Apr. 8, 2014, 1 page.

*Primary Examiner* — Kodzovi Acolatse
*Assistant Examiner* — Manuel Rangel
(74) *Attorney, Agent, or Firm* — Lee Hong Degerman Kang Waimey

(57) ABSTRACT

Provided are a communication method in a carrier aggregation system in which a plurality of cells are aggregated, and an apparatus utilizing such a communication method. The plurality of cells can be cells using mutually different frame structures. The communication method receives an uplink grant from a first downlink subframe of a first cell, and transmits a PUSCH from a first uplink subframe of a second cell on the basis of the uplink grant. The uplink grant
(Continued)

comprises an uplink DAI, and, with GU being the time interval between the first downlink subframe and the first uplink subframe, the UL DAI indicates the number of downlink subframes, from among the plurality of downlink subframes of the second cell connected so as to transmit an acknowledgement/not-acknowledgement (ACK/NACK) from the first uplink subframe, for which the time interval to the first uplink subframe is equal to or greater than the GU.

10 Claims, 14 Drawing Sheets

(51) Int. Cl.
  *H04L 1/18* (2006.01)
  *H04W 16/00* (2009.01)
  *H04L 5/00* (2006.01)
  *H04W 76/15* (2018.01)

(52) U.S. Cl.
  CPC .............. *H04L 5/0082* (2013.01); *H04L 5/14* (2013.01); *H04W 16/00* (2013.01); *H04W 76/15* (2018.02)

(56) References Cited

U.S. PATENT DOCUMENTS

| | | | |
|---|---|---|---|
| 2012/0057539 A1* | 3/2012 | Kuo ................... | H04W 36/0094 370/329 |
| 2013/0010716 A1* | 1/2013 | Dinan ................. | H04W 76/025 370/329 |
| 2013/0028205 A1* | 1/2013 | Damnjanovic ......... | H04L 5/001 370/329 |
| 2013/0107766 A1* | 5/2013 | Etemad ................. | H04L 5/0007 370/280 |
| 2014/0071932 A1* | 3/2014 | Fu .......................... | H04L 5/1469 370/329 |
| 2015/0236824 A1* | 8/2015 | Lei ........................ | H04L 1/1861 370/280 |

FOREIGN PATENT DOCUMENTS

| | | |
|---|---|---|
| KR | 10-2012-0080684 | 7/2012 |
| WO | 2010/148319 | 12/2010 |
| WO | 2012/091532 | 7/2012 |

* cited by examiner

METHOD AND APPARATUS FOR COMMUNICATING IN CARRIER AGGREGATION SYSTEM

CROSS-REFERENCE TO RELATED APPLICATIONS

This application is the National Stage filing under 35 U.S.C. 371 of International Application No. PCT/KR2014/000212, filed on Jan. 8, 2014, which claims the benefit of U.S. Provisional Application Nos. 61/750,315, filed on Jan. 8, 2013 and 61/751,921, filed on Jan. 13, 2013, the contents of which are all hereby incorporated by reference herein in their entirety.

BACKGROUND OF THE INVENTION

Field of the Invention

The present invention relates to wireless communication and, more particularly, to a method and apparatus for performing hybrid automatic repeat request (HARQ) in a carrier aggregation system.

Related Art

Carrier aggregation systems are getting attention these days. A carrier aggregation system refers to a broadband wireless communication system comprising more than one component carrier (CC) which provides bandwidth smaller than the target bandwidth of the broadband wireless communication system. In a carrier aggregation system, a term of a serving cell may be used instead of the term of a component carrier. A serving cell associated with the carrier aggregation system may consist of a pair of two component carriers such as a downlink component carrier (DL CC) and an uplink component carrier (UL CC) or consist only of DL CCs. A carrier aggregation system is such a kind of system where a plurality of serving cells is associated with one user equipment.

Conventional carrier aggregation systems allowed aggregating only those component carriers operating in the same scheme. In other words, the a priori art allowed aggregating only the component carriers operating based on the frequency division duplex (FDD) scheme or the time division duplex (TDD) scheme. In particular, in the case of TDD, it is assumed that component carriers to be aggregated are set up with the same uplink-downlink configuration (UL-DL configuration). UL-DL configuration is intended to inform in which subframe each individual subframe within a frame consisting of a plurality of subframes is used between an uplink (UL) subframe and a downlink (DL) subframe.

However, there are chances that future wireless communication systems may not be constrained to aggregate only those component carriers employing the same scheme. For example, a component carrier (cell) operating based on the FDD scheme or a component carrier (cell) consisting only of uplink subframes may be aggregated into the component carrier (cell) operating based on the TDD scheme. Or a component carrier (cell) operating based on the TDD scheme may be aggregated into a component carrier (cell) operating based on the FDD scheme.

In a TDD cell using component carriers operating based on the TDD scheme, a timing relationship (it is called GU) between a subframe receiving a uplink grant and a subframe to which a uplink data channel scheduled by the uplink grant and a timing relationship (it is called DC) between a subframe receiving a downlink data channel and a subframe transmitting ACK/NACK (acknowledgement/not-acknowledgement) about the downlink data channel are determined according to uplink-downlink configuration (UL-DL configuration).

In conventional systems, the timing relationships, namely, GU and DC, have been determined according to UL-DL configuration provided through system information; however, in future wireless communication systems, the GU and the DC may be configured differently from the UL-DL configuration given commonly to the corresponding cell by the system information.

Meanwhile, since a DL subframe and a UL subframe may not exist in pairs within a frame operating in a TDD cell, one UL subframe may have to transmit ACK/NACK to a plurality of DL subframes. For error-free transmission of ACK/NACK, the number of DL subframes actually scheduled among the plurality of DL subframes should be known when one UL subframe transmits ACK/NACK. The number of DL subframes actually scheduled is informed through an uplink grant scheduling the one UL subframe. Since DC is larger than or equal to GU according to the UL-DL configuration of a conventional TDD cell, the number of DL subframes actually scheduled can be known through an uplink grant. It is also the case for an FDD cell.

However, in case the GU and the DC in the future wireless communication system are configured differently from the uplink-downlink configuration given by the system information, there are times when GU becomes larger than DC. At this time, if an uplink grant attempts to inform of the number of actually scheduled DL subframes, scheduling of a downlink data channel should be predicted. If the prediction is inaccurate, an error may occur in ACK/NACK transmission.

SUMMARY OF THE INVENTION

The present invention provides a method and an apparatus for communication in a carrier aggregation system.

In one aspect, provided is a communication method for a carrier aggregation system aggregating a plurality of cells. The method includes receiving an uplink grant from a first downlink subframe of a first cell and transmitting a Physical Uplink Shared Channel (PUSCH) based on the uplink grant in a first uplink subframe of a second cell.

The uplink grant includes a UL Downlink Assignment Index (DAI) and if a time interval between the first downlink subframe and the first uplink frame is called GU, the UL DAI represents the number of downlink subframes where a time interval with respect to the first uplink subframe is larger than or equal to the GU among a plurality of downlink subframes of the second cell connected to transmit ACK/NACK (acknowledgement/not-acknowledgement) from the first uplink subframe.

In another aspect, provided is an apparatus. The apparatus includes a Radio Frequency (RF) unit transmitting and receiving a radio signal and a processor connected to the RF unit. The processor receives a uplink grant in a first downlink subframe of a first cell and transmits a Physical Uplink Shared Channel (PUSCH) based on the uplink grant in a first uplink subframe of a second cell, the uplink grant includes a Downlink Assignment Index (DAI), if a time interval between the first downlink subframe and the first uplink frame is called GU, the DAI represents the number of downlink subframes where a time interval with respect to the first uplink subframe is larger than or equal to the GU, among a plurality of downlink subframes of the second cell connected to transmit ACK/NACK (acknowledgement/not-acknowledgement) from the first uplink subframe.

Error in ACK/NACK transmission can be reduced in a carrier aggregation system.

DESCRIPTION OF EXEMPLARY EMBODIMENTS

User Equipment (UE) can be fixed or can have mobility. UE can also be called another term, such as a Mobile Station (MS), a Mobile Terminal (MT), a User Terminal (UT), a Subscriber Station (SS), a wireless device, a Personal Digital Assistant (PDA), a wireless modem, or a handheld device.

The BS commonly refers to a fixed station that communicates with UE. The BS can also be called another tem, such as an evolved-NodeB (eNodeB), a Base Transceiver System (BTS), or an access point.

Communication from a BS to UE is called downlink (DL), and communication from UE to a BS is called uplink (UL). A wireless communication system including a BS and UE can be a Time Division Duplex (TDD) system or a Frequency Division Duplex (FDD) system. A TDD system is a wireless communication system that performs UL and DL transmission/reception using different times in the same frequency band. An FDD system is a wireless communication system that enables UL and DL transmission/reception at the same time using different frequency bands. A wireless communication system can perform communication using radio frames.

Figure 1:
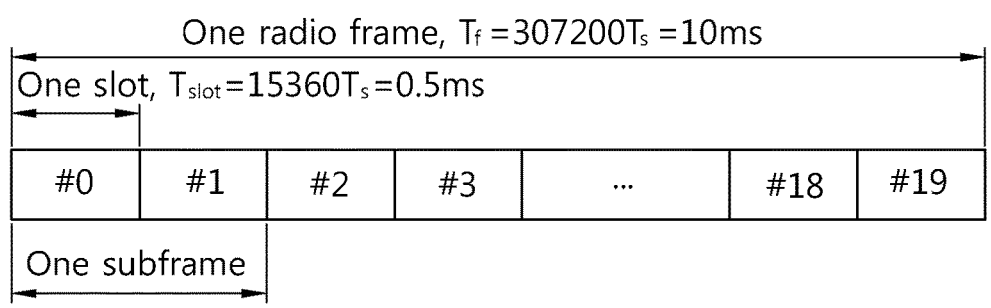
FIG. 1 shows the structure of an FDD radio frame.

FIG. 1 shows the structure of an FDD radio frame.

An FDD radio frame (in what follows, it is called an FDD frame for short) consists of 10 subframes, and one subframe comprises two consecutive slots. Slots included in an FDD frame can be indexed with 0 to 19. The time interval required for one subfame to be transmitted is called a transmission time interval (TTI), and the TTI can be used as a minimum scheduling unit. For example, length of one subframe can be 1 ms, and length of one slot can be 0.5 ms. If length of a radio frame is denoted by $T_f$, $T_f$ can be 307200 $T_s$, which is equal to 10 ms.

In the FDD frame, downlink subframes and uplink subframes can be placed in a consecutive manner in the respective frequency bands. In other words, the FDD frame includes 10 downlink subframes in a first frequency band and 10 uplink subframes in a second frequency band. Downlink subframes and uplink subframes within the FDD frame can be indexed sequentially from 0 to 9.

Figure 2:
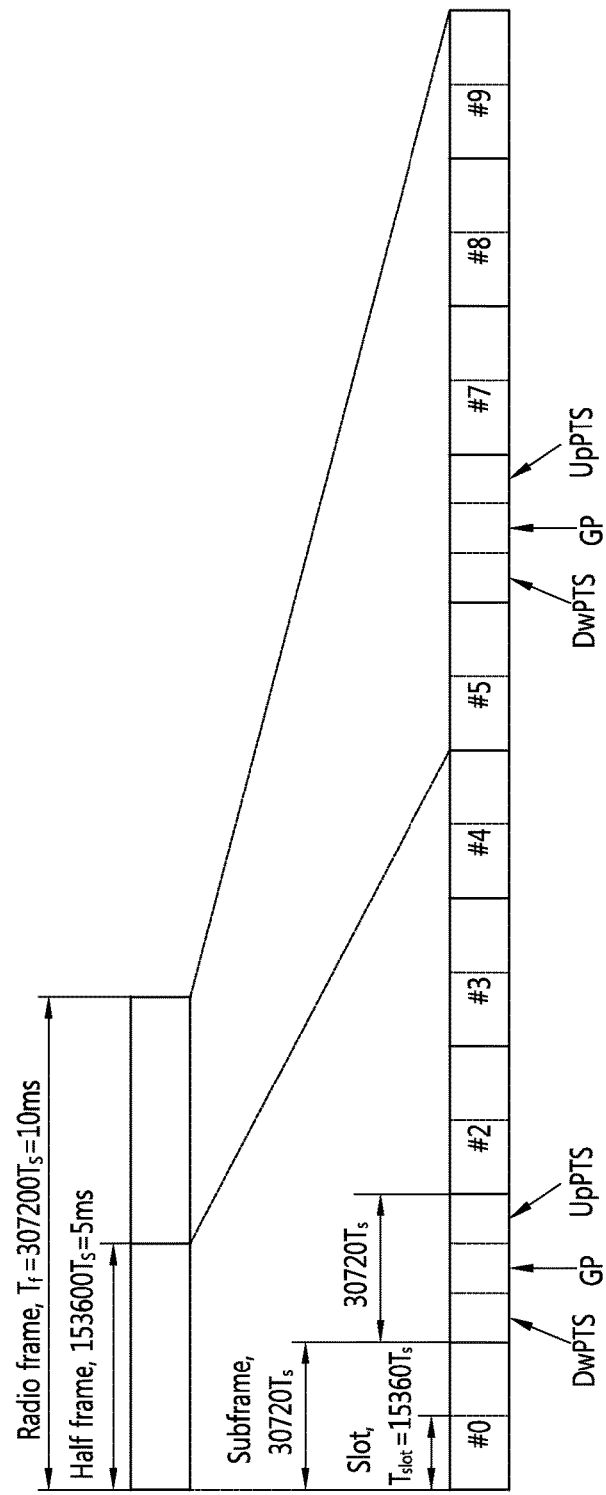
FIG. 2 shows the structure of a TDD radio frame.

FIG. 2 illustrates a structure of a TDD radio frame.

With reference to FIG. 2, a TDD radio frame (in what follows, it is called a TDD frame) comprises two half-frames, and one half-frame comprises 5 subframes, thereby comprising a total of 10 subframes. A TDD frame includes a uplink (UL) subframe, a downlink (DL) subframe, and a special (S) subframe within the same frequency band. If subframes of a TDD frame are indexed from 0, subframes indexed with #1 and #6 may correspond to special subframes, where a special subframe includes a downlink pilot time slot (DwPTS), a guard period (GP), and a uplink pilot time slot (UpPTS). The DwPTS is used for an intimal cell search, synchronization, or channel estimation in a user equipment; and can be used for downlink transmission. The UpPTS is used for channel estimation in a base station and uplink transmission synchronization of a user equipment, which can be used for uplink transmission. The GP is a time period defined for removing interference generated in a uplink due to multi-path delay of a downlink signal between the uplink and a downlink. The GP and the UpPTS can be used as a time gap.

As described above, a DL subframe and a UL subframe of a TDD frame coexist in the same frequency band. Table 1 shows one example of UL-DL configuration of a TDD frame.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, 'D' represents a DL subframe, 'U' a UL subframe, and 'S' a special subframe. Receiving UL-DL configuration from a base station, a user equipment can determine whether individual subframes in a TDD frame correspond to DL subframes (or S subframes) or UL subframes.

Figure 3:
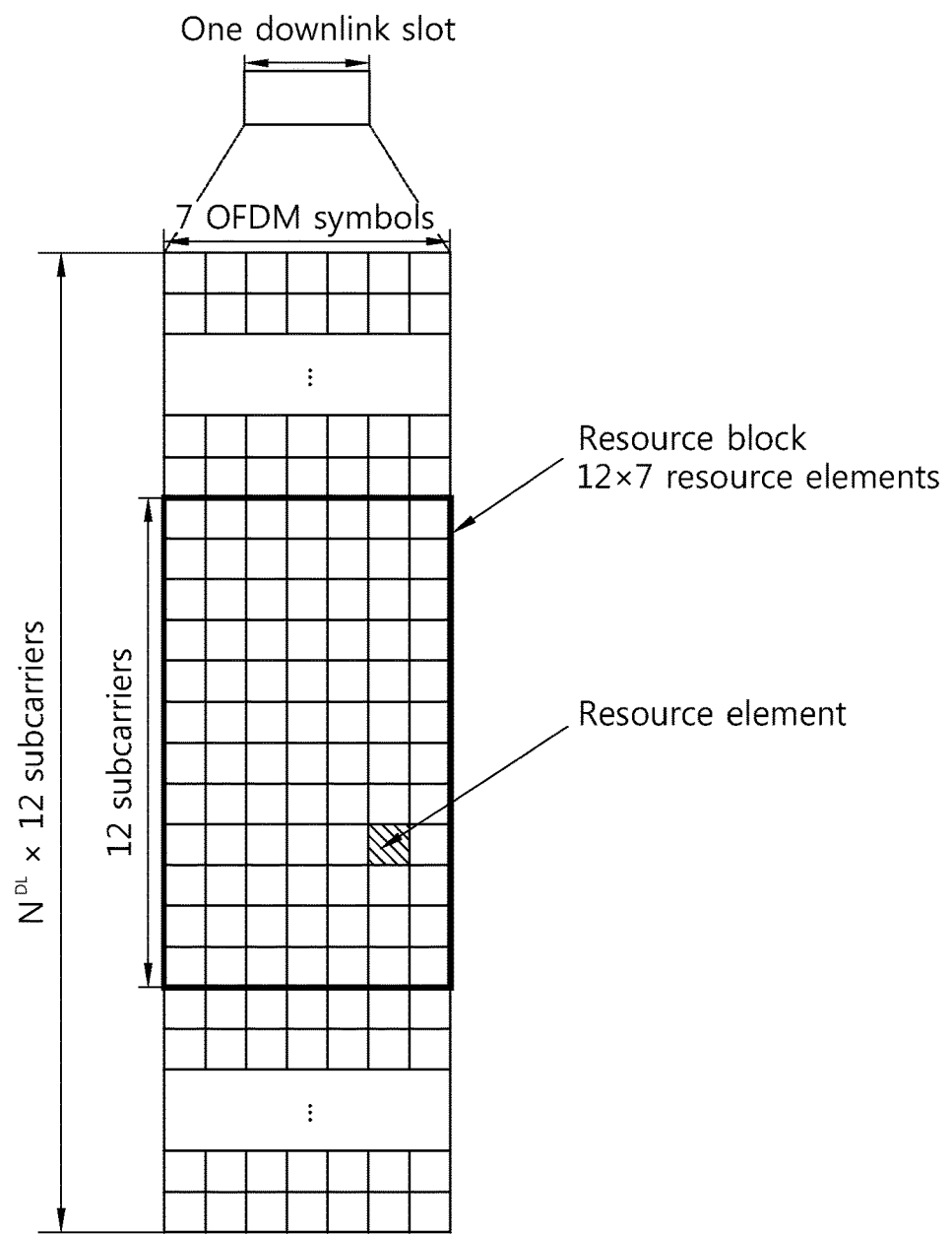
FIG. 3 shows an example of a resource grid for one downlink slot.

FIG. 3 shows an example of a resource grid for one downlink slot.

Referring to FIG. 3, the downlink slot includes a plurality of Orthogonal Frequency Division Multiplexing (OFDM) symbol in the time domain and includes $N_{RB}$ Resource Blocks (RBs) in the frequency domain. The RBs includes one slot in the time domain and a plurality of consecutive subcarrier in the frequency domain in a resource allocation unit. The number of RBs $N_{RB}$ included in the downlink slot depends on a downlink transmission bandwidth $N^{DL}$ configured in a cell. For example, in an LTE system, the $N_{RB}$ can be any one of 6 to 110. An uplink slot can have the same structure as the downlink slot.

Each element on the resource grid is called a Resource Element (RE). The RE on the resource grid can be identified by an index pair (k,l) within a slot. Here, k (k=0, . . . , $N_{RB} \times 12-1$) is a subcarrier index within the frequency domain, and 1 (1=0, . . . , 6) is an OFDM symbol index within the time domain.

Although 7×12 REs including 7 OFDM symbols in the time domain and 12 subcarrier in the frequency domain have been illustrated as being included in one RB in FIG. 3, the number of OFDM symbols and the number of subcarriers within an RB are not limited thereto. The number of OFDM symbols and the number of subcarriers can be changed in various ways depending on the length of a CP, frequency spacing, etc. In one OFDM symbol, one of 128, 256, 512, 1024, 1536, and 2048 can be selected and used as the number of subcarriers.

Figure 4:
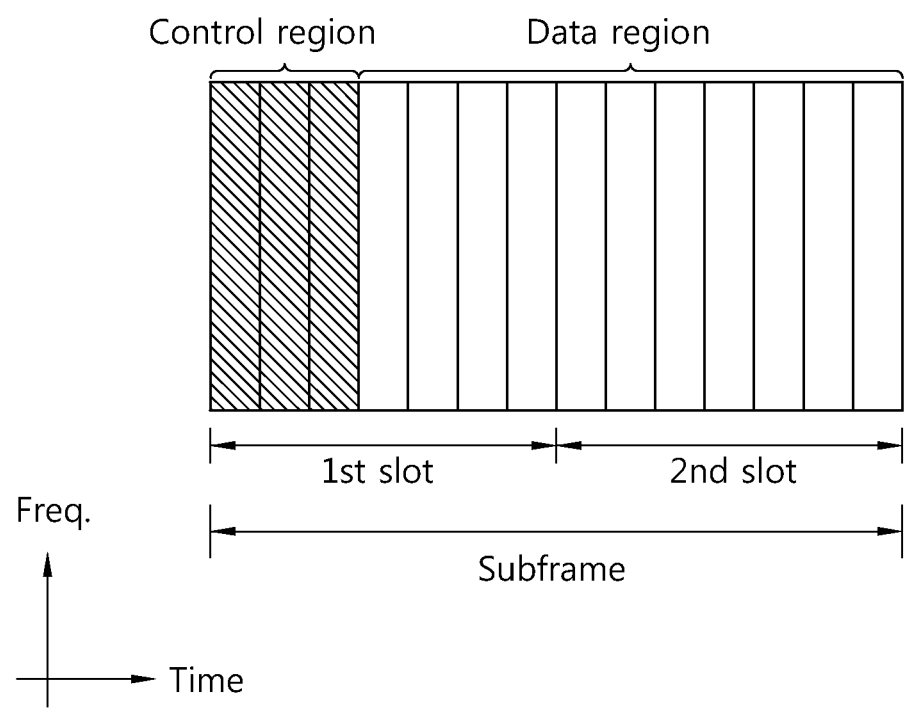
FIG. 4 shows the structure of a DL subframe.

FIG. 4 shows the structure of a DL subframe.

Referring to FIG. 4, a downlink (DL) subframe is divided into a control region and a data region in the time domain. The control region includes a maximum of former 3 (maximum 4 according to circumstances) OFDM symbols of a first slot within a subframe, but the number of OFDM symbols included in the control region can be changed. A control channel different from a physical downlink control channel (PDCCH) is allocated to the control region, and a physical downlink shared channel (PDSCH) is allocated to the data region.

A PCFICH that is transmitted in the first OFDM symbol of a subframe carries a Control Format Indicator (CFI) regarding the number of OFDM symbols (i.e., the size of a control region) that are used to send control channels within the subframe. UE first receives a CFI on a PCFICH and then monitors PDCCHs. Unlike in a PDCCH, a PCFICH is not subject to blind decoding, but is transmitted through the fixed PCFICH resources of a subframe.

A PHICH carries a positive-acknowledgement (ACK)/negative-acknowledgement (NACK) signal for an uplink Hybrid Automatic Repeat reQuest (HARQ). An ACK/NACK signal for uplink (UL) data on a PUSCH which is transmitted by UE is transmitted on a PHICH.

Control information transmitted through a PDCCH is called Downlink Control Information (DCI). DCI can include the resource allocation of a PDSCH (this is also called a DL grant), the resource allocation of a PUSCH (this is also called an UL grant), a set of transmit power control commands for individual MSs within a specific UE group and/or the activation of a Voice over Internet Protocol (VoIP).

Downlink Control Information (DCI) including a DL grant can include a HARQ process number. The DCI has 3 bits for the HARQ process number in the case of FDD, while 4 bits in the case of TDD. The UE can differentiate HARQ processes based on the HARQ process number.

The base station determines a PDCCH format according to the DCI to be sent to the UE, attaches a Cyclic Redundancy Check (CRC) to the DCI, and masks the CRC with a unique identifier (which is called a Radio Network Temporary Identifier (RNTI)) depending on the owner or intended use of the PDCCH.

In case the PDCCH is used for a specific UE, a unique identifier of the UE, for example, the CRC can be masked with a Cell-RNTI (C-RNTI). Similarly, in case the PDCCH is used for a paging message, the CRC can be masked with a paging identifier, for example, a Paging-RNTI (P-RNTI). In the case of a PDCCH for system information, the CRC can be masked with system information identifier, namely, system information-RNTI (SI-RNTI). In order to indicate a random access response, which is a response to a random access preamble of the UE, the CRC can be masked with the Random Access RNTI (RA-RNTI). If the C-RNTI is used, the PDCCH carries control information for the corresponding specific UE (which is called UE-specific control information); if a different RNTI is used, the PDCCH carries common control information that is received by all or a plurality of the UEs within the cell.

The base station encodes CRC-added DCI and generates coded data. The encoding includes channel coding and rate matching. Afterwards, the base station modulates coded data, generates modulated symbols, and transmits the modulated symbols by mapping them into physical resource elements (REs).

The PDSCH transmitted in the data region is a downlink data channel. System information, data, and so on can be transmitted through the PDSCH. And the PBCH carries system information essential for the UE to communicate with the base station, where the system information transmitted through the PBCH is called a Master Information Block (MIB). Similarly, the system information transmitted on the PDSCH specified by the PDCCH is called a System Information Block (SIB).

Figure 5:
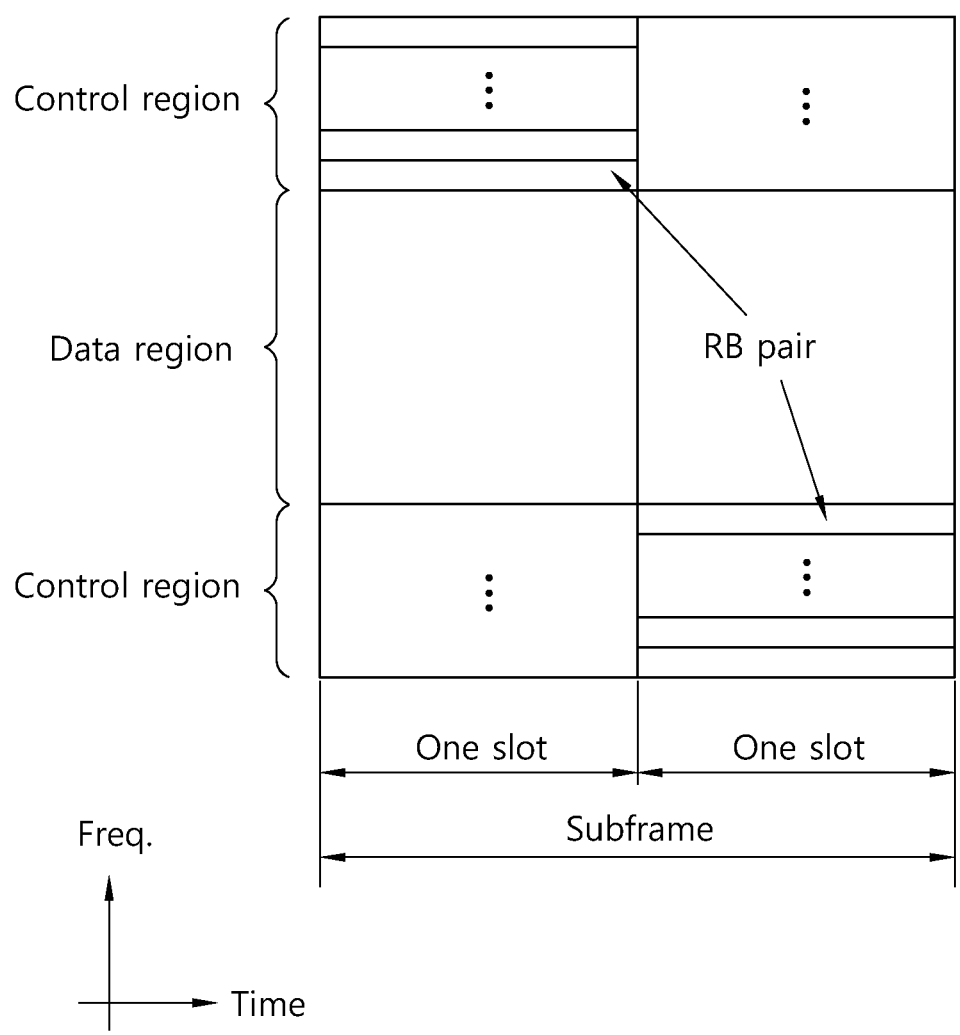
FIG. 5 shows the structure of an UL subframe.

FIG. 5 illustrates a structure of a uplink subframe.

With reference to FIG. 5, in the frequency domain, a uplink subframe can be divided into a control region where a Physical Uplink Control Channel (PUCCH) carrying uplink control information is allocated and a data region where a Physical Uplink Shared Channel (PUSCH) carrying user data and/or control information is allocated.

The PUCCH is allocated onto an RB pair in a subframe. RBs belonging to an RB pair occupy different sub-carriers in each of a first and a second slot.

<Hybrid Automatic Repeat Request (HARQ)>

HARQ operations can be classified into synchronous and asynchronous HARQ.

In a synchronous HARQ scheme, when an initial transmission fails, subsequent retransmission is carried out at a predetermined timing. The retransmission timing can be carried out at each $8^{th}$ time unit (subframe) after the initial transmission. Since that timing is already agreed upon between the base station and the UE, there is no need to additionally inform of the timing. If a data transmitter has received a NACK message, data can be retransmitted at each 8-th subframe until the data transmitter receives an ACK message.

On the other hand, the asynchronous HARQ scheme can be carried out as a retransmission timing is newly scheduled or through additional signaling. The timing of retransmission of the data that were once failed for transmission can be varied by various factors such as a channel condition.

Meanwhile, HARQ operations can be classified into channel non-adaptive HARQ and channel-adaptive HARQ. In the channel non-adaptive HARQ scheme, data modulation, the number of resource blocks, and coding method for retransmission are determined according to the configuration at the initial transmission. On the other hand, in the channel adaptive HARQ scheme, the configuration changes according to the channel condition. For example, suppose a transmitter has transmitted data by using 6 resource blocks at the initial transmission. Then the same number of resource blocks is used to retransmit the data in the channel non-adaptive HARQ scheme. However, in the case of the channel adaptive HARQ scheme, even with the same assumption that 6 resource blocks have been used for the initial data transmission, resource blocks of which the number is larger or smaller than 6 is used for data retransmission depending on the channel condition.

According to the classification above, four different combinations can be applied for HARQ operations; however, asynchronous and channel adaptive HARQ scheme; and synchronous and channel non-adaptive HARQ scheme are two commonly used schemes. The asynchronous and channel adaptive HARQ scheme can maximize retransmission efficiency by changing the amount of resources used and the retransmission timing adaptively according to the channel condition. However, the asynchronous and channel adaptive HARQ scheme readily increases the overhead, by which the scheme is usually not employed for uplink transmission. On the other hand, the synchronous and channel non-adaptive HARQ scheme predetermines retransmission timing and resource allocation, thus requiring virtually zero overhead; however, if the scheme is used in the channel condition exhibiting a severe change, the retransmission efficiency degrades considerably.

In the current 3GPP LTE system, asynchronous HARQ scheme is used for downlink transmission while synchronous HARQ scheme is used for uplink transmission. In other words, asynchronous HARQ scheme is used when the base station transmits/retransmits data while synchronous HARQ scheme is used when the UE transmits/retransmits data.

Figure 6:
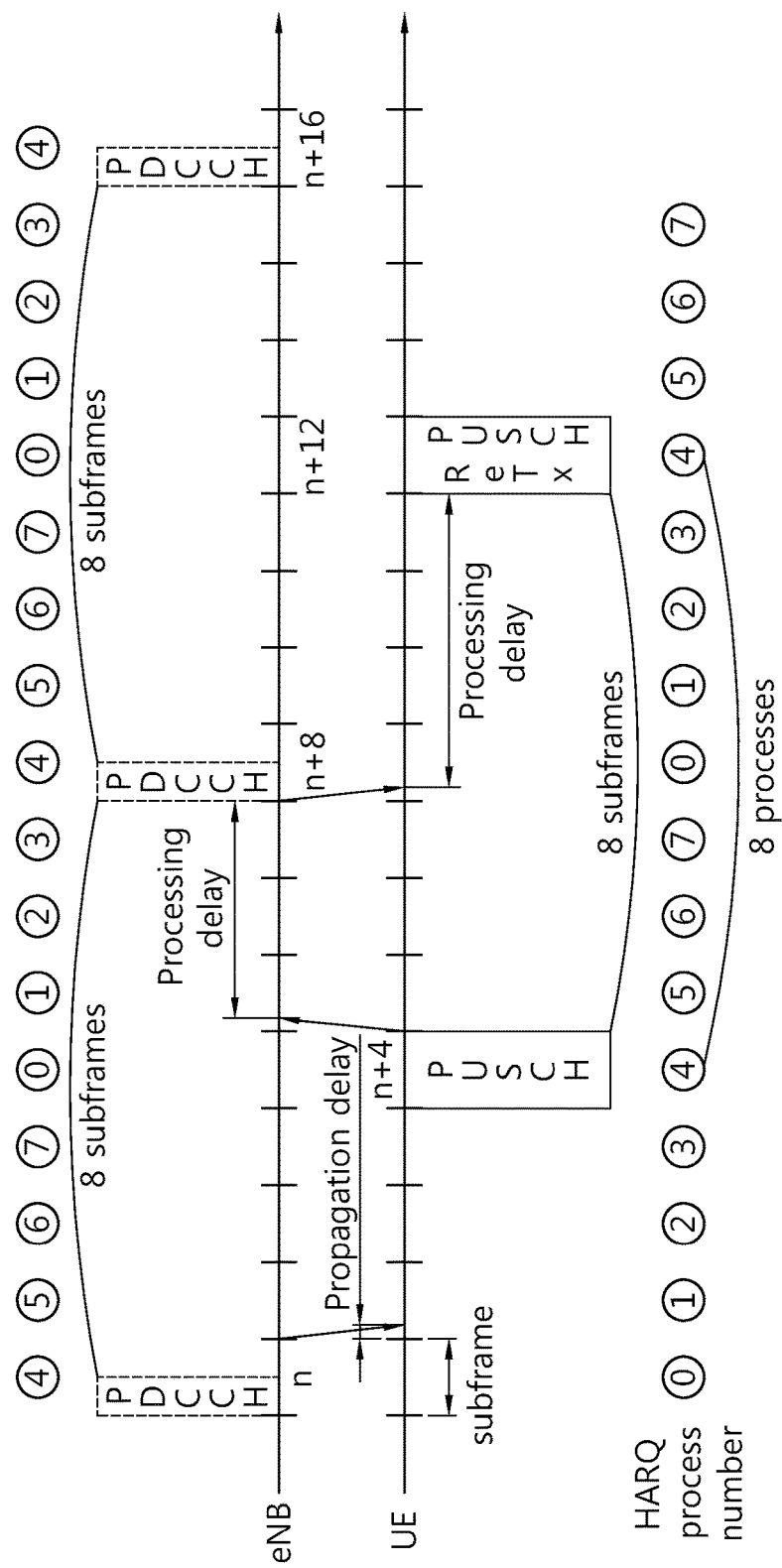
FIG. 6 illustrates a synchronous HARQ scheme used for uplink transmission.

FIG. 6 illustrates a synchronous HARQ scheme used for uplink transmission.

With reference to FIG. 6, after receiving a UL grant, which is scheduling information, at subframe n, the UE transmits the PUSCH at subframe n+4. It should be noted that the PUSCH is scheduled by the UL grant. At subframe n+8, the UE can receive the ACK/NACK signal related to the PUSCH through the PHICH or can receive the UL grant through the PDCCH. The UE can retransmit the PUSCH at subframe n+12. Subframe n, n+4, n+8, and n+12 are the subframes constituting the same HARQ process, and the same HARQ process number can be assigned to the subframes.

Meanwhile, as shown in FIG. 6, a time delay occurs until the UE transmits the next data after receiving the UL grant or the ACK/NACK signal from the base station. The time delay is generated due to a channel propagation delay and processing time required for data decoding and encoding. In order to prevent data transmission from being stopped during the time delay period, a method for transmitting data by using an independent HARQ process is being used.

For example, suppose the shortest time period from data transmission to the next data transmission is 8 subframes for one HARQ process. Then data transmission can be carried out without discontinuity by employing 8 independent HARQ processes. In the LTE FDD scheme, a maximum of 8 HARQ processes can be allocated in case the system is not based on the Multi Input Multi Output (MIMO) operation. In the LTE FDD scheme, the maximum number of HARQ processes can be varied according to UL-DL configuration, which will be described in detail later. In case two codewords are transmitted simultaneously based on the MIMO operation, the two codewords can be transmitted together through one HARQ process, or the two codewords can be transmitted separately by the respective HARQ processes.

In what follows, a carrier aggregation system will be described.

Figure 7:
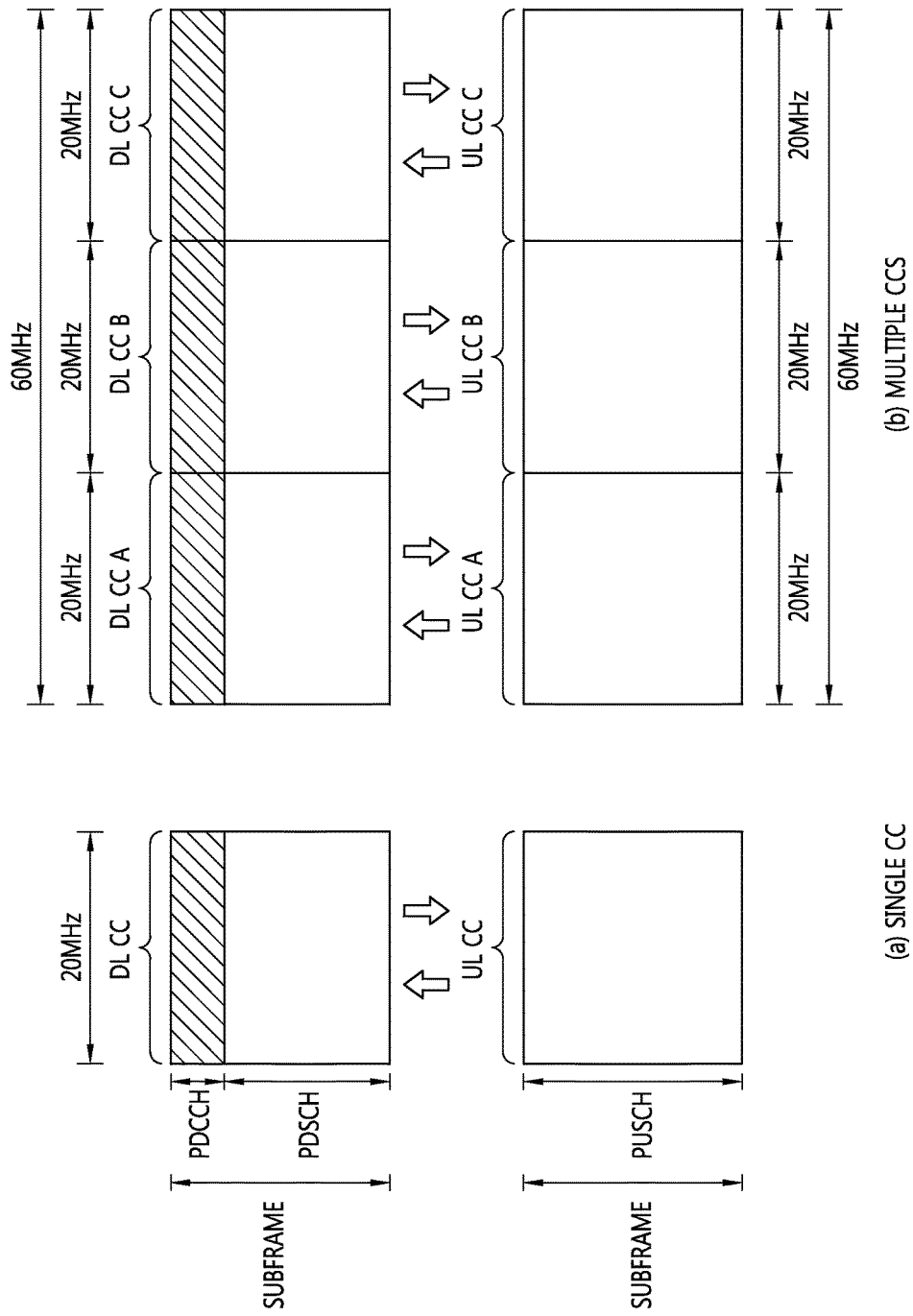
FIG. 7 is an example where a single component carrier system and a carrier aggregation system are compared with each other.

FIG. 7 is an example where a single component carrier system and a carrier aggregation system are compared with each other.

With reference to FIG. 7, in a single component carrier system, only one component carrier is allocated to the UE for uplink and downlink transmission. The bandwidth of a component carrier can vary, but only one component carrier is allocated to the UE. On the other hand, in a carrier aggregation (CA) system, a plurality of component carriers (DL CC A to C, UL CC A to C) can be allocated. For example, three component carriers of 20 MHz bandwidth can be allocated to the UE so that bandwidth of 60 MHz can be allocated.

Carrier aggregation systems can be classified into contiguous carrier aggregation systems where individual component carriers are disposed contiguously and non-contiguous carrier aggregation systems where individual component carriers are disposed apart from each other. In what follows, if a system is simply called a carrier aggregation system, it should be understood that the system refers to both of the case where component carriers are contiguous and the case where component carriers are non-contiguous.

When more than one component carrier is aggregated, target component carriers can use the same bandwidth employed by existing systems to ensure backward compatibility with the existing systems. For example, the 3GPP LTE system supports bandwidth of 1.4 MHz, 3 MHz, 5 MHz, 10 MHz, 15 MHz, and 20 MHz, while the 3GPP LTE-A system is capable of implementing broadband more than 20 MHz by using only the bandwidth of the 3GPP LTE system. Or a broadband system can be implemented by defining new bandwidth instead of adopting the bandwidth of existing systems directly.

System frequency band of a wireless communication system is differentiated by a plurality of carrier frequency. At this time, carrier frequency refers to the center frequency of a cell. In what follows, it is assumed that a cell can be composed of a pair of downlink frequency resources and uplink frequency resources. Or a cell can be composed only of downlink frequency resources. In general, if carrier aggregation is not taken into account, a single cell can always have uplink and downlink frequency resources in the form of a pair.

In order for packet data to be transmitted or received through a specific cell, the UE first needs to complete configuration of the specific cell. At this time, configuration refers to the state where system information required for transmitting and receiving data to and from the corresponding cell has been completed. For example, configuration can include the whole process of receiving common physical layer parameters required for data transmission and reception, MAC layer parameters, or parameters required for particular operations in the RRC layer. A cell which has completed configuration enters a state where the cell can immediately transmit and receive packets once information indicating that packet data can be transmitted is received.

A cell which has completed configuration can stay in the activation or deactivation state. At this time, activation refers to the state where data transmission or reception is being carried out or is in a ready state. The UE can monitor or receive the PDCCH and the PDSCH of an activated cell so that the UE can check the resources (which can be frequency or temporal resources) allocated to the UE.

Deactivation refers to the state where it is not possible to transmit or receive traffic data but measurement or transmission/reception of minimal information is allowed. The UE can receive system information (SI) required for receiving packets from a deactivated cell. On the other hand, the UE does not monitor or receive the PDCCH and the PDSCH of a deactivated cell to check the resources (which can be frequency or temporal resources) allocated to the UE.

Cells can be divided into primary cells (Pcells), secondary cells (Scells), and serving cells.

If the cell is configured for carrier aggregation, the UE establishes only one RRC connection to the network. During the RRC connection establishment/re-establishment/handover process, one cell provides Non-Access Stratum (NAS) mobility information and security input. Such a kind of cell is called a primary cell. In other words, a primary cell refers to the cell in which the UE carries out an initial connection establishment procedure or a connection re-establishment procedure or the cell specified as a primary cell during the handover procedure.

A secondary cell refers to the cell configured to provide additional radio resources after an RRC connection is established through a primary cell.

A serving cell refers to the cell configured to provide a service to the UE, and in case carrier aggregation is not configured or the UE is unable to provide carrier aggregation, the serving cell is composed of primary cells. In case carrier aggregation is configured, a plurality of serving cells can be employed. A plurality of serving cells can be formed by a set of one or more cells from among a primary cell or all of the secondary cells.

A Primary Component Carrier (PCC) refers to the CC corresponding to a primary cell. A PCC is such a kind of CC among various CCs, through which the UE establishes (RRC) connection to the base station during an initial phase. The PCC is a special CC which deals with establishing (RRC) connection for signaling of a plurality of CCs and manages UE context information which carries connection information related to the UE. Also, in case the PCC establishes connection to the UE and enters an RRC connected mode, the PCC always stays in the activation mode. A downlink component carrier corresponding to the primary cell is called a DownLink Primary Component Carrier (DL PCC), and a uplink component carrier corresponding to the primary cell is called a UpLink Primary Component Carrier (UL PCC).

A Secondary Component Carrier (SCC) refers to the CC corresponding to a secondary cell. In other words, an SCC is allocated to the UE in addition to a PCC; an SCC is an extended carrier for allocation of additional resources in addition to a PCC and can be in the activation or the deactivation mode. A downlink component carrier corresponding to a secondary cell is called a DL Secondary CC (DL SCC), and a uplink component carrier corresponding to a secondary cell is called a UL SCC.

As for component carriers constituting a serving cell, a downlink component carrier may constitute one serving cell, and a downlink component carrier and a uplink component carrier may be configured to be connected to each other to form one serving cell. In the prior art, a serving cell is not allowed to be formed by only one uplink component carrier. However, the present invention allows a serving cell to be formed by using only a uplink component carrier.

Activation/deactivation of a component carrier is equivalent to the concept of activation/deactivation of a serving cell. For example, suppose a serving cell 1 is composed of a DL CC1. Then activation of the serving cell 1 indicates activation of the DL CC1. Now, suppose a serving cell 2 is configured so that connection is established between a DL CC2 and a UL CC2. Then activation of the serving cell 2 indicates activation of the DL CC2 and the UL CC2. In this sense, each component carrier can correspond to a cell.

The number of component carriers aggregated can be set differently for downlink and uplink. The case where the number of downlink CCs is the same as the number of uplink CCs is called symmetric aggregation, while it is called asymmetric aggregation if the numbers are different. Similarly, sizes of CCs (namely, bandwidth) can be different from each other. For example, if 5 CCs are used to form bandwidth of 70 MHz, the bandwidth may be realized by 5 MHz CC (carrier #0), 20 MHz CC (carrier #1), 20 MHz CC (carrier #2), 20 MHz CC (carrier #3), and 5 MHz CC (carrier #4).

As described above, different from single component carrier systems, a carrier aggregation system can support a plurality of serving cells, namely, a plurality of component carriers (CCs).

Meanwhile, a carrier aggregation system can support Cross-Carrier Scheduling (CCS). CCS is such a scheduling method capable of resource allocation of the PDSCH transmitted through another component carrier by using the PDCCH transmitted through a particular component carrier and/or resource allocation of the PUSCH transmitted through another component carrier in addition to a component carrier linked to the particular component carrier by default. In other words, the PDCCH and the PDSCH can be transmitted through different DL CCs, and the PUSCH can be transmitted through a UL CC which is not linked to the DL CC through which the PDCCH including a UL grant has been transmitted, namely, a UL CC belonging to a different cell other than the UL CC constituting the same cell. As described above, a CCS-supporting system needs a carrier indicator that can be used to indicate which PDSCH/PUSCH transmitted through some DL CC/UL CC is being scheduled by the PDCCH. The field including such a carrier indicator is called a Carrier Indication Field (CIF).

A CCS-supporting system can include the CIF in the existing Downlink Control Information (DCI) format. In the CCS-supporting system, for example, in the LTE-A system, the CIF is added to an existing DCI format (namely, the DCI format used in the LTE system); therefore, 3 bits can be extended, and the PDCCH structure can re-use the coding method, the resource allocation method (in other words, resource mapping based on the CCE), and so on used in the existing system.

The base station can configure a set of PDCCH monitoring DL CCs (monitoring CCs). The set of PDCCH monitoring DL CCs comprises part of the whole DL CCs aggregated, and if CCS is determined, the UE carries out PDCCH monitoring/decoding only for the DL CCs included in the set of PDCCH monitoring DL CCs. In other words, only through the DL CC included in the set of PDCCH monitoring DL CCs, does the base station transmits the PDCCH related to the PDSCH/PUSCH to be scheduled. The set of PDCCH monitoring DL CCs can be configured in a UE-specific manner, in a UE group-specific manner, or in a cell-specific manner.

Non-Cross Carrier Scheduling (NCCS) refers to the scheme where scheduling is carried out within the same carrier (cell) and data are received/transmitted according to the scheduling. The NCCS is also called self-scheduling. The NCCS can be regarded as a scheduling method that has been applied to existing UEs for which only a single cell is established.

Meanwhile, existing carrier aggregation systems are based on the assumption that carriers using the same frame structure are aggregated. For example, the assumption is that FDD cells employing FDD frames are aggregated or TDD cells employing TDD frames are aggregated. Also, it is further assumed that individual TDD cells use the same UL-DL configuration when the TDD cells are aggregated.

However, a future carrier aggregation system can carry out aggregation of an FDD cell and a TDD cell and aggregation of TDD cells, where each individual TDD cell may use different UL-DL configuration. For example, carrier aggregation where the primary cell is an FDD cell and the secondary cell is a TDD cell can also be used. Similarly, such kind of carrier aggregation can also be used, where the primary cell is an FDD cell and the secondary cell consists of uplink subframes.

In what follows, determining at which subframe each step of the synchronous HARQ is carried out is said to set up timing of the synchronous HARQ. For configuration of synchronous HARQ timing, propagation delay of a signal and processing time required to process the signal should be taken into account. It requires minimum preparation time for the UE or the base station since it receives a signal until the next signal in response to the received signal is transmitted; if the preparation time is expressed in units of subframes, it can be called $k_m$ subframe. $k_m$ can be 4, for example.

In the following, for the purpose of convenience, a few terms are defined to describe synchronous HARQ timing used in the uplink transmission. These terms can be used in the following descriptions and drawings.

First, the time interval between transmission of a UL grant and the initial transmission of the PUSCH is called GU and denoted by k. The time interval between the initial transmission of the PUSCH and transmission of the PHICH is called UH and is denoted by j. The time interval between transmission of the PHICH and retransmission of the PUSCH is called HU and denoted by r. The time interval between retransmission of the UL grant and retransmission of the PUSCH is called GU' and denoted by k'. The time interval between transmission of the PUSCH and transmission of the next UL grant is denoted by UG. Also, the time interval between transmission of the PDSCH and transmission of ACK/NACK about the PDSCH is denoted by DC. ACK/NACK can be transmitted through the PUCCH or transmitted being piggybacked on the PUSCH together with data.

Figure 8:
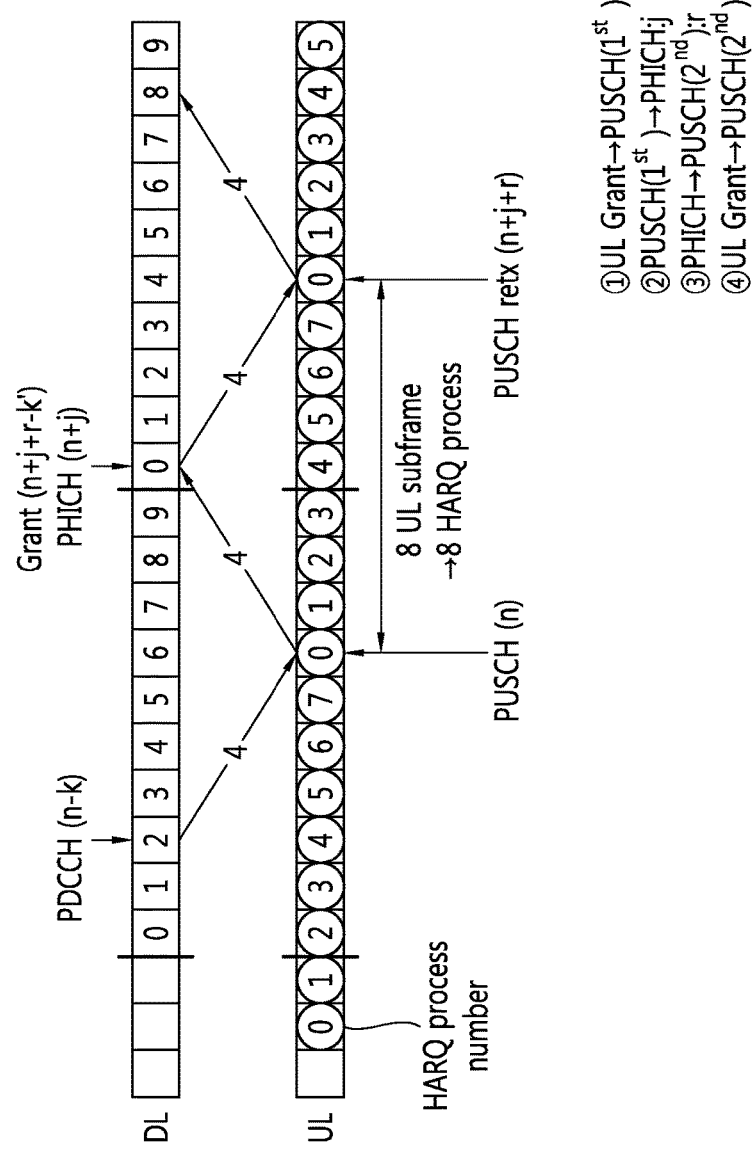
FIG. 8 illustrates synchronous HARQ timing of the prior art for the case where only one FDD cell is employed.

FIG. 8 is one example illustrating synchronous HARQ timing. More specifically, FIG. 8 illustrates synchronous HARQ timing of the prior art for the case where only one FDD cell is employed.

FIG. 8 shows a downlink subframe n−k to which a UL grant is transmitted by the base station through the PDCCH, a uplink subframe n to which the PUSCH scheduled by the UL grant is transmitted by the UE, a downlink subframe n+j to which the ACK/NACK which is a response to the PUSCH is transmitted by the base station (through the PHICH), and a uplink subframe n+j+r to which the PUSCH is retransmitted by the UE in case the ACK/NACK is NACK. Meanwhile, although the UE can retransmit the PUSCH based on the ACK/NACK received through the PHICH, the UE may retransmit the PUSCH at the subframe n+j+r based on the UL grant received at the subframe n+j+r−k'.

In an FDD frame, DL subframes and UL subframes are disposed in a contiguous manner and always exist with a 1-to-1 relationship. Therefore, in the synchronous HARQ timing, k=j=r=k'=$k_m$=4. The number of HARQ processes can be determined by the number of UL subframes included in the interval between transmission of the PUSCH scheduled and retransmission of the PUSCH, and a total of 8 independent HARQ processes can be operated.

Meanwhile, for the case of a TDD frame, the number of DL subframes in a TDD frame is not always equal to the number of UL subframes in the same TDD frame. Therefore, the k, j, r, and k' values based on the condition that $k_m$=4 can be varied according to UL-DL configuration.

Figure 9:
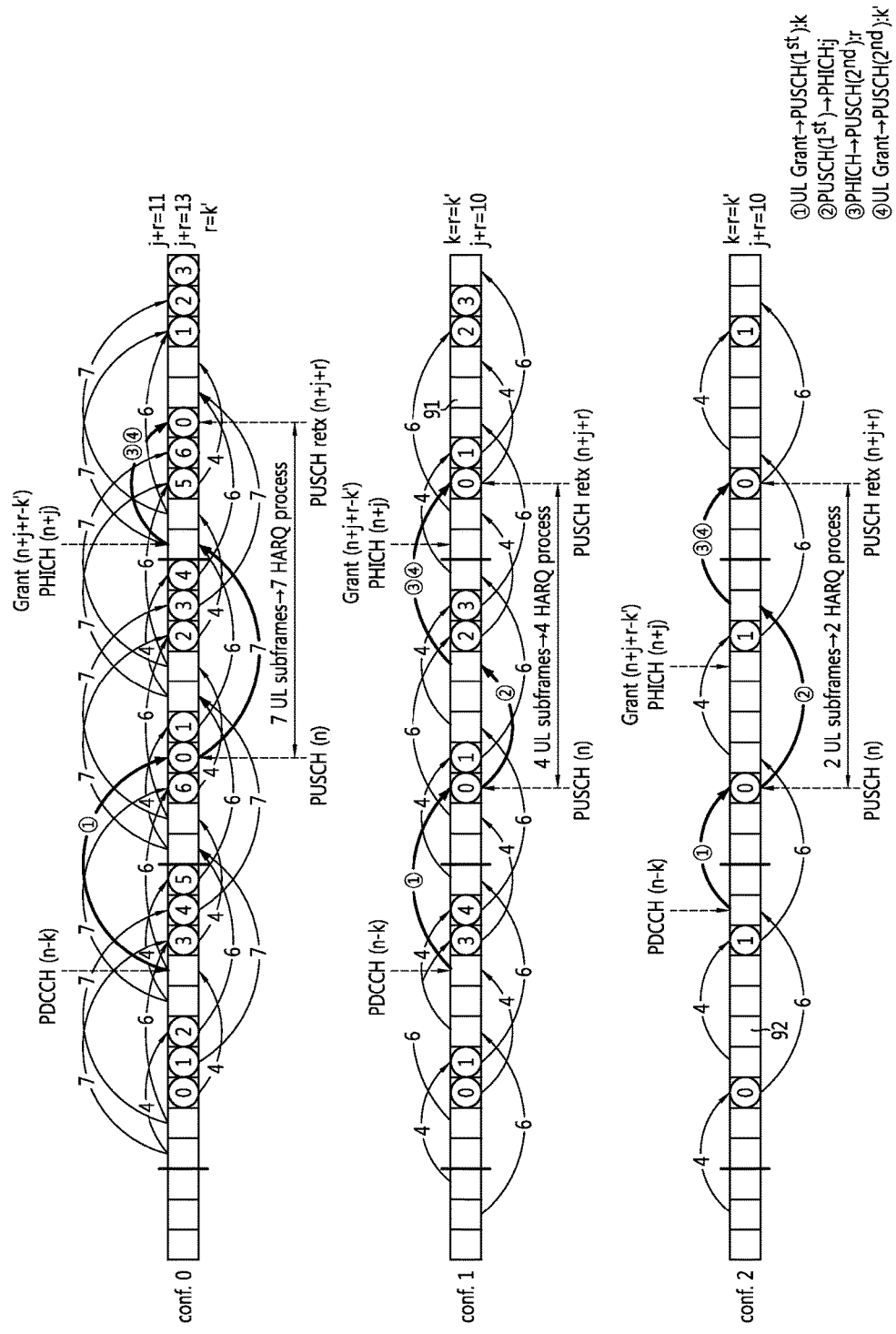
FIG. 9 and FIG. 10 illustrate conventional synchronous HARQ timing for each of UL-DL configuration in one TDD cell.
Figure 10:
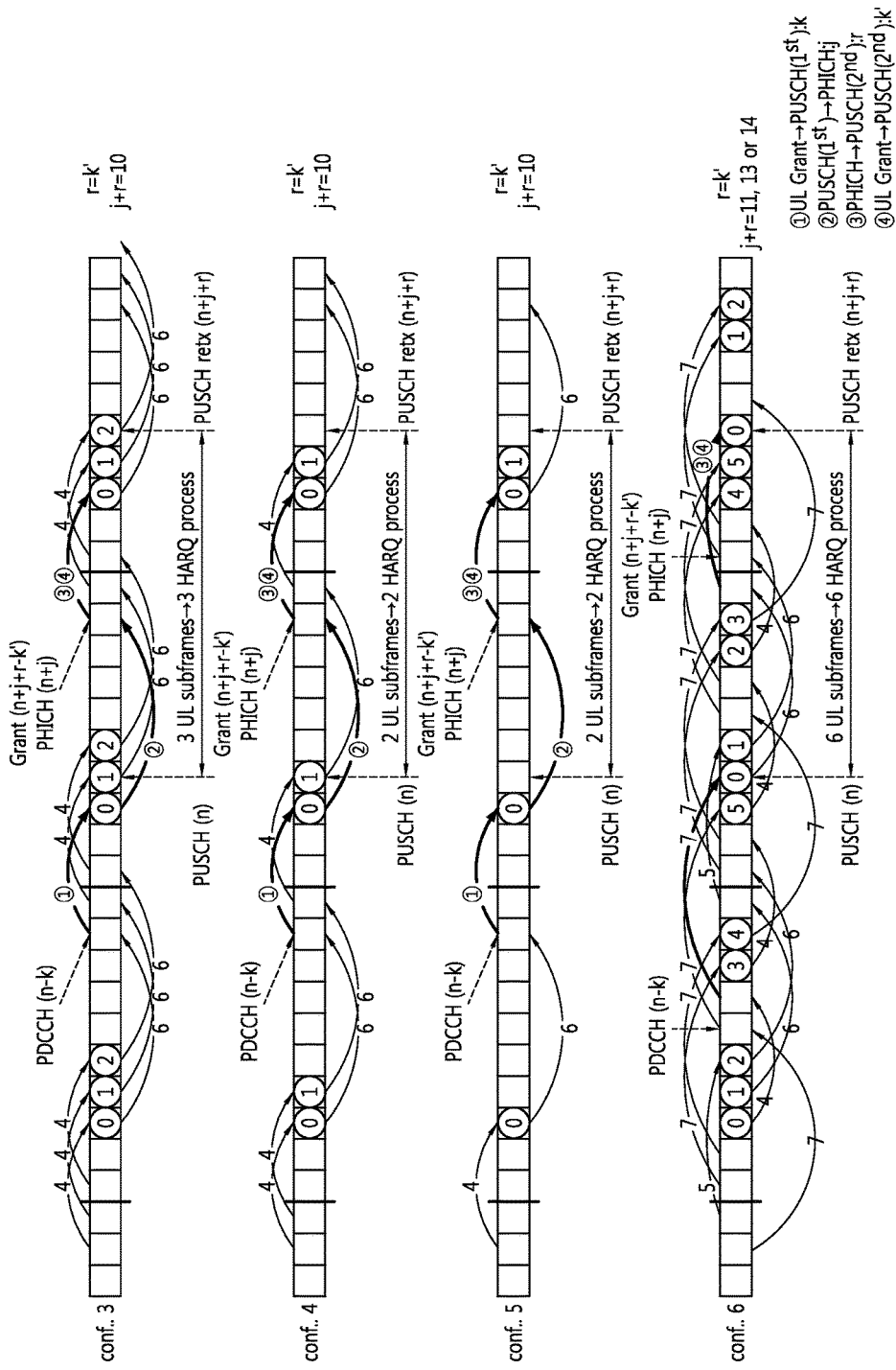

FIGS. 9 to 10 are examples illustrating conventional synchronous HARQ timing for each UL-DL configuration in one TDD cell. In other words, FIGS. 9 and 10 illustrate conventional synchronous HARQ timing according to UL-DL configuration when only one TDD cell is used.

FIG. 9 illustrates conventional synchronous HARQ timing for each of UL-DL configuration 0 to 2. Given that the subframe to which the UE transmits the PUSCH is subframe n, the figure shows subframe n−k receiving the PDCCH including a UL grant scheduling the PUSCH, subframe n+j receiving ACK/NACK with respect to the PUSCH through the PHICH, subframe n+j+r−k' receiving a UL grant for retransmission of the PUSCH, and subframe n+j+r to which the PUSCH is retransmitted.

FIG. 10 shows subframe n, subframe n−k, subframe n+j, subframe n+j+r−k', and subframe n+j+r for each of UL-DL configuration 3 to 6.

In FIGS. 9 and 10, those subframes denoted by numbers are uplink subframes, and the PUSCH can be transmitted to each of the uplink subframes. Those subframes not containing numbers are downlink subframes or special subframes. Also, in a downlink subframe connected to a uplink subframe by an arrow, the PDCCH including a UL grant or the PHICH including an ACK/NACK is transmitted by the base station. Among DL subframes included in a TDD frame, a downlink subframe not connected to a uplink subframe with an arrow is a downlink subframe that does not have the PHICH. For example, in FIG. 9, downlink subframes 91, 92 are examples of a downlink subframe that does not have the PHICH.

Meanwhile, in carrier aggregation, if aggregated TDD carriers use the same UL-DL configuration or use NCCS, the existing synchronous HARQ timing for a single component carrier as shown in FIGS. 9 and 10 can be applied equally to each individual carrier.

The table below shows k values about subframe n in one TDD cell or FD cell when a UL grant is transmitted from subframe n−k by the base station and the PUSCH scheduled by the UL grant is transmitted from subframe n. In other words, Table 2 shows GU (time interval between a UL grant and the PUSCH).

TABLE 2

| UL-DL Config-uration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | | | 7/6 | 7 | 4 | | | 7/6 | 7 | 4 |
| 1 | | | 6 | 4 | | | | 6 | 4 | |
| 2 | | | 4 | | | | | 4 | | |
| 3 | | | 4 | 4 | 4 | | | | | |
| 4 | | | 4 | 4 | | | | | | |
| 5 | | | 4 | | | | | | | |
| 6 | | | 7 | 7 | 5 | | | 7 | 7 | |
| FDD | 4 | 4 | 4 | 4 | 4 | 4 | 4 | 4 | 4 | 4 |

Table 3 shows a set K comprising k, values as its components about subframe n in one TDD cell or FDD cell when the PDSCH is transmitted from subframe n−k, by the base station and the UE transmits ACK/NACK about the PDSCH through the PUCCH of subframe n. In other words, Table 3 shows DC (time interval between PDSCH and PUCCH), representing a time interval between transmission of the PDSCH which is a downlink data channel and transmission of ACK/NACK which is a response corresponding to the PDSCH transmission.

TABLE 3

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |
| FDD | 4 | 4 | 4 | 4 | 4 | 4 | 4 | 4 | 4 | 4 |

Meanwhile, Table 3 assumes that ACK/NACK about the PDSCH is transmitted through the PUCCH, but the present invention is not limited to the aforementioned assumption. In other words, the present invention can also be applied to the case where ACK/NACK is transmitted through the PUSCH.

If aggregated carriers in a carrier aggregation system use frame structures different from each other, there are times when the synchronous HARQ timing of the existing single component carrier (cell) cannot be applied in the same way. For example, suppose the primary cell is a TDD cell, the secondary cell is an FDD cell, and CCS is applied. In this case, the DL subframe to which a UL grant is transmitted can belong to the primary cell, and the UL subframe to which the PUSCH scheduled by the UL grant can belong to the secondary cell. Assume that synchronous HARQ timing with respect to a single component carrier is applied to the temporal relationship between the DL subframe of the primary cell and the UL subframe of the secondary cell. At this time, if synchronous HARQ timing with respect to a single component carrier is used, the DL subframe to which a UL grant scheduling a UL subframe of the secondary cell may not belong to the primary cell. This is so because the DL subframes are not disposed contiguously since the primary cell is a TDD cell. Therefore, it is necessary to determine synchronous HARQ timing which takes into account aggregation of component carriers which use frame structures different from each other.

In what follows, the present invention will be described.

In case cells having different frame structures are aggregated, reference timing to be applied to HARQ timing of each cell can be configured.

For example, in a TDD cell, UL-DL configuration is determined through system information, and basically, HARQ timing is determined based on the UL-DL configuration. However, in case an FDD cell is aggregated to the secondary cell, reference timing can be provided to the UE to determine the HARQ timing of the FDD cell. For example, while the UL-DL configuration 0 is provided to the TDD cell through the system information, if the TDD cell is aggregated to an FDD cell, UL-DL configuration 1 can be provided as the reference timing of the FDD cell.

Reference timing can be provided for each of the GU and DC; Table 2 can be used for GU, while the whole or part of Table 3 can be used for DC.

In the same way, if an FDD cell is aggregated to a cell using a different frame structure, reference timing specifying HARQ timing different from when the existing FDD cell is used alone can be provided.

Now suppose a primary cell which is a TDD cell and a secondary cell which is an FDD cell are aggregated. Further assume that reference timing for GU in the TDD cell is set up by UL-DL configuration 1 of Table 2 and reference timing for DC is set up by UL-DL configuration 2 of Table 3. In this case, GU is 6 and DC is 4 in subframe 2. In other words, there arises a case where GU is larger than DC.

Figure 11:
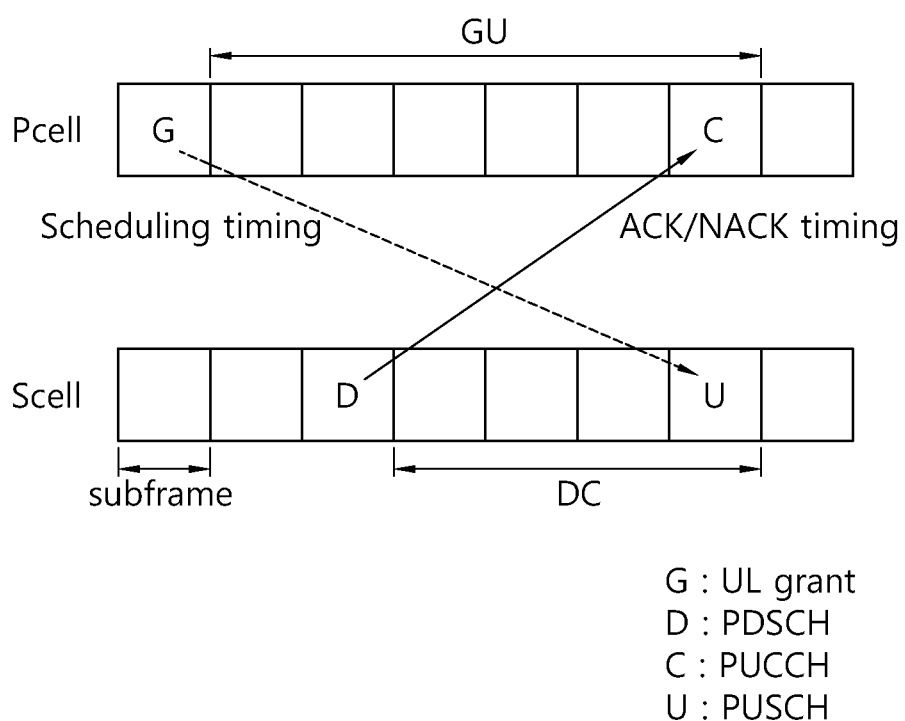
FIG. 11 illustrates a case where GU is larger than DC.

FIG. 11 illustrates a case where GU is larger than DC.

With reference to FIG. 11, in view of the UE, GU which is a time interval between a UL grant received in the primary cell and the PUSCH transmitted from the secondary cell is 6 subframes; and DC which is a time interval between the PDSCH received in the secondary cell and transmission of ACK/NACK through the PUCCH of the primary cell or the PUSCH of the secondary cell is 4 subframes. As shown in FIG. 11, if GU is larger than DC, transmission of a UL grant precedes downlink scheduling timing.

Table 4 illustrates a case where GU's interval is larger than DC's interval.

TABLE 4

| UL-DL Configuration | Subframe n | | | | | | | | | |
|---|---|---|---|---|---|---|---|---|---|---|
| For GU | 0 | 1 | 2 | 3 | 4 | 5 | 6 | 7 | 8 | 9 |
| 0 (GU7) | — | — | 1, 2, 3, 4, 5, F | 1, 3, 4, F | | | | 1, 2, F | 1, F | |
| 0 (GU6) | | | 2, 3, 4, 5, F | | | | | 2, F | | |
| 1 | | | 2, 5 | | | | | 2 | | |
| 6 | — | — | 0, 1, 2, 3, 5, F | 1, 3, 4, F | 0, 3, F | | | 0, 1, 2, F | 1, F | |

Table 4 shows reference timing for DC (see Table 3) which can cause a case where GU becomes larger than DC when UL-DL configuration 0, 1, and 6 of Table 2 are used as reference timing for GU in the subframe n of a TDD cell. In Table 4, F denotes FDD.

GU also becomes larger than DC when a TDD cell and an FDD cell are aggregated and the FDD cell uses a DL subframe and a UL subframe on the timing not defined in the UL-DL configuration of the TDD cell.

Meanwhile, when a UL grant schedules a first UL subframe, the first UL subframe can be connected to a plurality of DL subframes which are targets of ACK/NACK transmission. For example, a first UL subframe can be connected to a plurality of DL subframes such as a first DL subframe, a second DL subframe, a third DL subframe, and a fourth DL subframe, where the first UL subframe can be configured to transmit ACK/NACK about the first to the fourth DL subframes.

At this time, the UL grant includes information about the number of DL subframes actually scheduled among the plurality of DL subframes, which is called Downlink Assignment Index (DAI). UL DAI can be 2 bits. The UE can know the number of actually scheduled DL subframes through the UL DAI and configures ACK/NACK accordingly.

As described with reference to FIG. 11, if GU is larger than DC, transmission of a UL grant precedes scheduling time of the PDSCH. Therefore, it is not possible to know the PDSCH to be actually scheduled, namely, the number of DL subframes, at the time of UL grant transmission, but the number of DL subframes can only be predicted.

To prevent such prediction, the present invention uses the following methods.

<First Embodiment>

Figure 12:
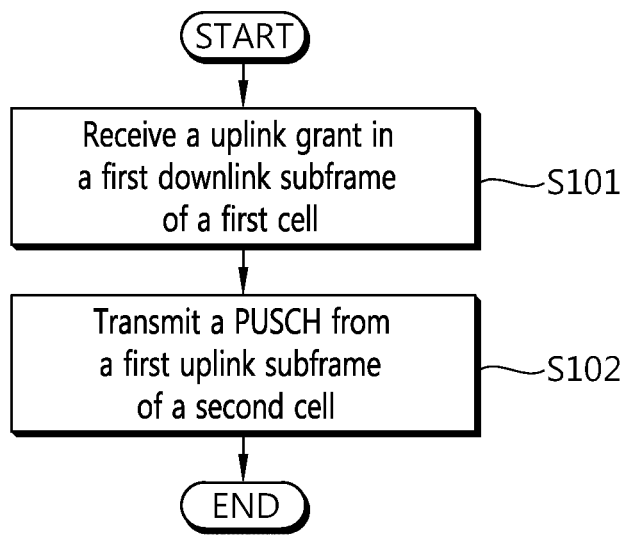
FIG. 12 illustrates a method according to a first embodiment of the present invention.

FIG. 12 illustrates a method according to a first embodiment of the present invention.

With reference to FIG. 12, the UE receives a uplink grant from a first downlink subframe of a first cell S101. The UE transmits the PUSCh from a first uplink subframe of a second cell S102. The PUSCH is scheduled by the uplink grant, and the uplink grant includes UL DAI. If the time interval between the first downlink subframe and the first uplink subframe is called GU, the UL DAI is configured so that it can represent the number of downlink subframes among a plurality of downlink subframes of the second cell connected to transmit ACK/NACK from the first uplink subframe, where a time interval with respect to the first uplink subframe is larger than or equal to the GU.

In other words, the value of the UL DAI included in a UL grant scheduling a UL subframe is configured only for a DL subframe satisfying the condition that the DC interval is larger than GU interval.

Figure 13:
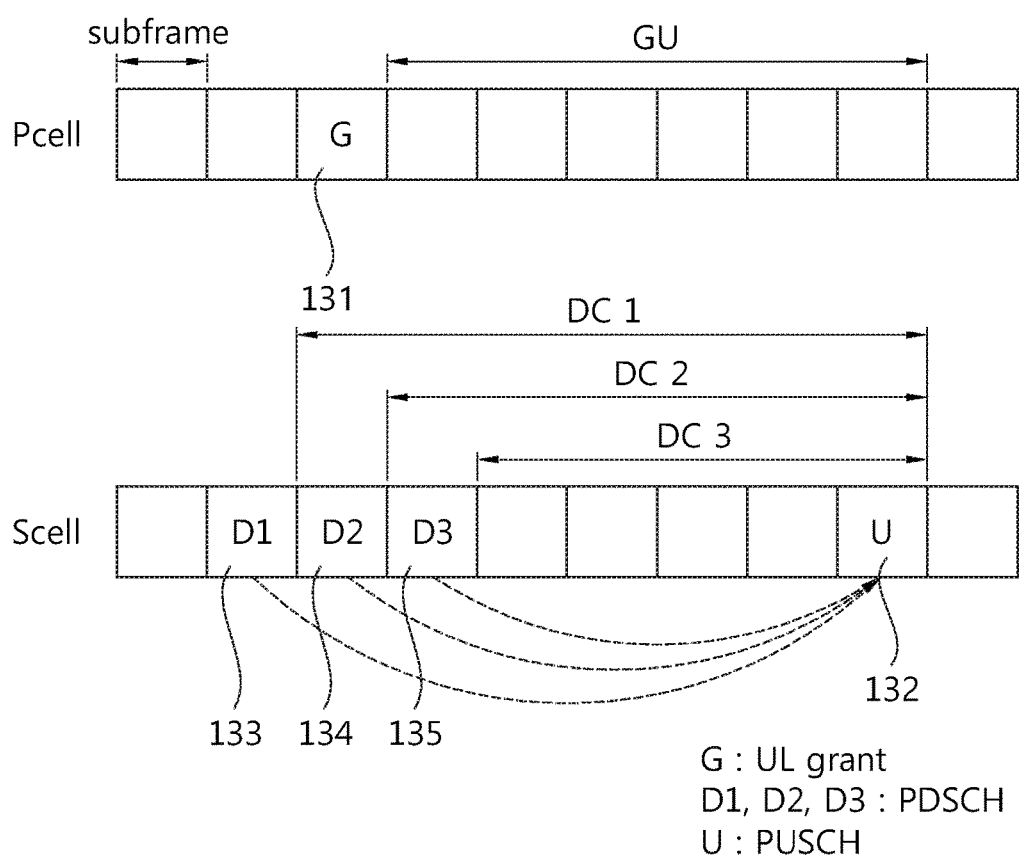
FIG. 13 illustrates a first embodiment.

FIG. 13 illustrates a first embodiment.

With reference to FIG. 13, the UE receives a UL grant from a first downlink subframe 131 of the primary cell (first cell). The UL grant schedules the PUSCH transmitted from a first uplink subframe 132 of a secondary cell (second cell). The UL grant includes UL DAI.

A plurality of DL subframes 133, 134, 135 are connected to a first uplink subframe 132. The ACK/NACK about the PDSCH received in the plurality of DL subframes 133, 134 are connected to be transmitted from the first uplink subframe 132.

In this case, suppose the time interval between the first downlink subframe and the first uplink subframe is called GU; and the time interval between each of the plurality of DL subframes 133, 134, 135 and the first uplink subframe 132 is DC1, DC2, and DC3. Then the UL DAI included in the UL grant indicates only the number of DL subframes where DC interval is larger than GU interval. In the example of FIG. 13, only two DL subframes 133, 134 correspond to this case; therefore, UL DAI can denote 2. The first UL subframe can transmit ACK/NACK about as many DL subframes as specified by UL DAI through the PUSCH.

<Second Embodiment>

In the corresponding cell, PUSCH scheduling about a UL subframe where DC interval is smaller than GU interval can be restricted. Such a UL subframe can be excluded from reference timing or can allow only the PUSCH retransmission by the PHICH and/or PUSCH transmission by Semi-Persistent Scheduling (SPS).

<Third Embodiment>

To prevent a case where DC interval is smaller than GU interval from happening, operations are performed under the assumption that those DL subframes where DC interval is smaller than GU interval at the time of PUSCH transmission in the corresponding UL subframe have not been scheduled.

<Fourth Embodiment>

The value of a UL DAI field included in a UL grant can be ignored or the UL DAI field may not be configured. Or the UL DAI field value can be transmitted, where the value represents an assumption that all of the DL subframes connected to transmit ACK/NACK in a UL subframe have been scheduled.

Or the reference timing to be applied for GU can be restricted so that only the UL-DL configuration 2, 3, 4, and 5 including only the GU value of 4 (GU=4) is used.

Or in the UL-DL configuration where DC interval can be smaller than GU interval, DC timing of the secondary cell can be made to use the UL-DL configuration provided by the system information of the corresponding secondary cell even in the case of cross carrier scheduling. In other words, independently of non-cross carrier scheduling and cross carrier scheduling, DC timing of the secondary cell can be made to use the UL-DL configuration of the secondary cell provided by the system information. Such UL-DL configuration can be UL-DL configuration 0, 1, 6.

Meanwhile, scheduling of the PUSCH is allowed and the bits of ACK/NACK when the ACK/NACK is piggybacked on the PUSCH can be configured as follows.

1. ACK/NACK bits are configured to correspond to the maximum number of DL subframes of each cell aggregated independently of UL DAI value. In other words, the ACK/NACK bits are configured in the same manner as the PUCCH.

2. ACK/NACK bits are configured according to the UL DAI for the DL subframes which are targets of the UL DAI, namely, those DL subframes of which the DC interval in the first embodiment is larger than GU interval. For example, the number of ACK/NACK bits can be determined according to the UL DAI value. ACK/NACK bits can be configured for all of DL subframes in each cell, where the DL subframes, of which the DC interval in the first embodiment is larger than GU interval, are not a target of UL DAI.

For example, suppose a UL subframe from which the PUSCH is transmitted is subframe 9 of the secondary cell and a DL subframe of the primary cell to which a UL grant (including UL DAI) scheduling the PUSCH is transmitted is subframe 3. In this case, GU interval becomes 6. Suppose DL subframes of the secondary cell connected to transmit ACK/NACK from subframe 9 of the secondary cell are subframe 1, 2, 4, and 5. Then the DC, which is a time interval between each of the subframe 1, 2, 4, and 5 and the subframe 9, becomes 8, 7, 5, and 4, respectively. In this case, UL DAI becomes the value of 2 to indicate the number of subframes (namely, subframe 1, 2) where DC is larger than GU, and the number of bits for ACK/NACK can be determined based on the UL DAI value. Similarly, for those DL subframes where DC is smaller than GU, namely, subframe 4, 5, the ACK/NACK bits are configured based on an assumption that the subframes are all scheduled. In the aforementioned example, the subframe number has been introduced only for the sake of understanding. For those DL subframes where DC interval is larger than GU interval, ACK/NACK bits are configured according to the UL DAI, and for those DL subframes where DC interval is smaller than GU interval, ACK/NACK bits may not be configured.

Meanwhile, in carrier aggregation, transmission of the PUSCH can be carried out in a plurality of cells, and piggyback of ACK/NACK can be carried out on one PUSCH.

The embodiments described above can be applied to the case where a cell to which the PDSCH is transmitted and a cell to which the PUSCH is transmitted are different. For example, even for the case where DC interval about the PDSCH of cell A is smaller than GU interval of the PUSCH of cell B, the PDSCH to be actually scheduled in cell A, namely, the number of DL subframes cannot be known at the time of transmission of a UL grant of cell B, which can only be predicted. In this case, the first to the fourth embodiment described above and the method for configuring ACK/NACK bits can be applied.

In the case of a plurality of PUSCHs, ACK/NACK can be piggybacked on the PUSCH which has the shortest GU timing. In case there are a few PUSCHs which have the same GU timing, ACK/NACK can be piggybacked on the PUSCH of a cell which has the smallest carrier index. In case reference timing of a TDD or an FDD cell is applied to each cell, ACK/NACK can be piggybacked first on the PUSCH of a cell to which reference timing of the FDD cell has been applied.

In the presence of a TDD or an FDD cell, ACK/NACK can be piggybacked first on the PUSCH of the FDD cell.

As an exception, for the PUSCH of a specific cell, independently of the embodiments described above, the PUSCH of the corresponding cell can be piggybacked. The specific cell can be the cell to which the PUCCH is transmitted, which can be the primary cell or a cell with a cell index 0.

CSI can be piggybacked on the PUSCH of a cell which has the smallest carrier index. Or CSI can be transmitted together from the PUSCH which transmits ACK/NACK.

The constraint that whether downlink subframes have been scheduled has to be known at the time of transmitting a UL grant as GU is larger than DC may act as a problem primarily for the case where 4 or more DL subframes are connected to a UL subframes to transmit ACK/NACK. For example, in case M is 4, the number of DL subframes which can be the target of ACK/NACK configuration becomes one of 0, 1, 2, 3, and 4 (in this case, M denotes the number of DL subframes connected to a UL subframe). Since UL DAI consists of 2 bits, the UL DAI can represent only four states at maximum. Therefore, in case UL DAI=0, it can be interpreted that the number of DL subframes is 0 or 4, and the exact number of DL subframes is determined depending on the situation.

Taking into account the above background, the methods described in the embodiments above may be applied only to the case where M is larger than 4.

In the descriptions above, cells can be grouped, and the methods described in the embodiments above can be applied on the basis of cell-groups. Also, the methods may be applied only for the case where the PUCCH and the PUSCH are not transmitted simultaneously.

According to the present invention, reference timing can use different UL-DL configuration other than the UL-DL configuration provided through system information to the TDD cell, or the aforementioned prediction can be prevented even for the case where reference timing different from the HARQ timing used in the FDD cell is set up.

Figure 14:
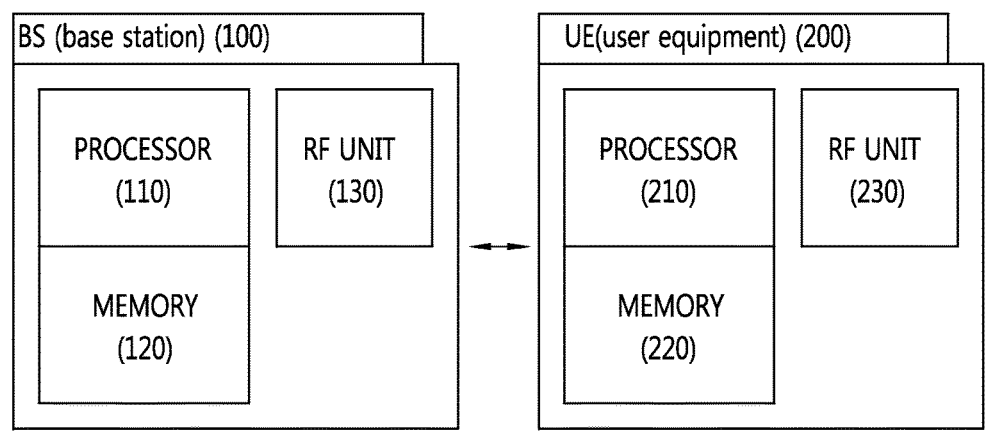
FIG. 14 is a block diagram of a wireless device in which embodiments of the present invention are implemented.

FIG. 14 is a block diagram of a wireless device in which embodiments of the present invention are implemented.

The base station 100 comprises a processor 110, a memory 120, and an Radio Frequency (RF) unit 130. The processor 110 implements proposed functions, processes and/or methods. For example, in case a first and a second cell are aggregated and allocated to a specific UE, the processor 110 can transmit a uplink grant from a first downlink subframe of the first cell and receive the PUSCH based on the uplink grant in the first uplink subframe of the second cell. At this time, the uplink grant includes a UL DAI, which a method for determining the UL DAI has been described with reference to FIGS. 12 and 13. The memory 120 is connected to the processor 110 and stores various types of information for driving the processor 110. The RF unit 130 is connected to the processor 110, and transmits and/or receives radio signals.

The UE 200 comprises a processor 210, a memory 220, and an RF unit 230. The processor 210 implements proposed function, processes and/or methods. For example, in case a first and a second cell are aggregated and allotted to the UE, the processor 210 can receive a uplink grant in a first downlink subframe of the first cell and transmit the PUSCH based on the uplink grant from a first uplink subframe of the second cell. The uplink grant includes a UL DAI. The processor 210 can configure ACK/NACK bits based on the UL DAI value. The memory 220 is connected to the processor 210 and stores various types of information for driving the processor 110. The RF unit 230 is connected to the processor 210, and transmits and/or receives radio signals.

The processor 110, 210 can include Application-Specific Integrated Circuit (ASIC), other chipsets, logical circuit, a data processing device and/or a converter converting a baseband signal and a radio signal to and from each other. The memory 120, 220 can include Read-Only Memory (ROM), Random Access Memory (RAM), flash memory, memory card, storage medium and/or other storage devices. The RF unit 130, 230 can include one or more antennas transmitting and/or receiving radio signals. If an embodiment is implemented by software, the techniques described above can be implemented in the form of a module (process or function) which performs the function described above. A module can be stored in the memory 120, 220 and can be executed by the processor 110, 210. The memory 120, 220 can be located inside or outside the processor 110, 210 and can be connected to the processor 110, 210 through a well-known means.

What is claimed is:

1. A method for a carrier aggregation system aggregating a primary cell (PCell) and a secondary cell (SCell), the method performed by a user equipment (UE), which is configured with the PCell and SCell, and comprising:
   receiving an uplink grant including an uplink Downlink Assignment Index (UL DAI) via a downlink PCell subframe of the PCell;
   receiving Physical Downlink Shared Channels (PDSCHs) via downlink subframes of the SCell; and
   transmitting a Physical Uplink Shared Channel (PUSCH) which includes acknowledgement/not-acknowledgement (ACK/NACK) information for some of the PDSCHs among the PDSCHs via an uplink subframe of the SCell based on a number of some downlink subframes of the SCell indicated by the UL DAI,
   wherein, if a time interval between a receiving time of a specific PDSCH on a specific downlink subframe of the SCell and a transmitting time of the PUSCH is same or larger than a time interval between a receiving time of the uplink grant and the transmitting time of the PUSCH, the specific PDSCH is one of the some PDSCHs and the specific downlink subframe is one of the some downlink subframes, and
   wherein, if the PCell uses a time division duplex (TDD) frame and the SCell uses a frequency division duplex (FDD) frame, the UL DAI indicates the number of the some downlink subframes of the SCell.

2. The method of claim 1, wherein the PCell carries out an initial connection establishment process with the base station or carrying out a connection re-establishment process.

3. The method of claim 2, wherein the SCell is added to the PCell.

4. The method of claim 1,
   wherein the UL DAI indicates a number of scheduled downlink subframes, and
   wherein the ACK/NACK information is configured based on the UL DAI.

5. The method of claim 1, wherein the ACK/NACK information is transmitted together with data scheduled by the uplink grant.

6. A user equipment (UE), which is configured with a primary cell (PCell) and a secondary cell (SCell), comprising:
- a Radio Frequency (RF) unit that transmits and receives a radio signal; and
- a processor connected to the RF unit and that:
    - receives an uplink grant including an uplink Downlink Assignment Index (UL DAI) via a downlink PCell subframe of the PCell;
    - receives Physical Downlink Shared Channels (PDSCHs) via downlink subframes of the SCell; and
    - transmits a Physical Uplink Shared Channel (PUSCH) which includes acknowledgement/not-acknowledgement (ACK/NACK) information for some PDSCHs among the PDSCHs via an uplink subframe of the SCell based on a number of some downlink subframes of the SCell indicated by the UL DAI,
- wherein if a time interval between a receiving time of a specific PDSCH on a specific downlink subframe of the SCell and a transmitting time of the PUSCH is same or larger than a time interval between a receiving time of the uplink grant and the transmitting time of the PUSCH, the specific PDSCH is one of the some PDSCHs and the specific downlink subframe is one of the some downlink subframes, and
- wherein if the PCell uses a time division duplex (TDD) frame and the SCell uses a frequency division duplex (FDD) frame, the UL DAI indicates the number of the some downlink subframes of the SCell.

7. The UE of claim 6, wherein the PCell carries out an initial connection establishment process with the base station or carrying out a connection re-establishment process.

8. The UE of claim 7, wherein the SCell is added to the PCell.

9. The UE of claim 6,
- wherein the UL DAI indicates a number of scheduled downlink subframes, and
- wherein the ACK/NACK information is configured based on the UL DAI.

10. The UE of claim 6, wherein the ACK/NACK information is transmitted together with data scheduled by the uplink grant.

* * * * *